Jan. 24, 1967     A. W. SEAR     3,300,568
SONAR SIMULATION APPARATUS
Filed Sept. 9, 1965     2 Sheets-Sheet 1

INVENTOR.
ARTHUR W. SEAR
BY
ATTORNEY

Jan. 24, 1967   A. W. SEAR   3,300,568
SONAR SIMULATION APPARATUS
Filed Sept. 9, 1965   2 Sheets-Sheet 2
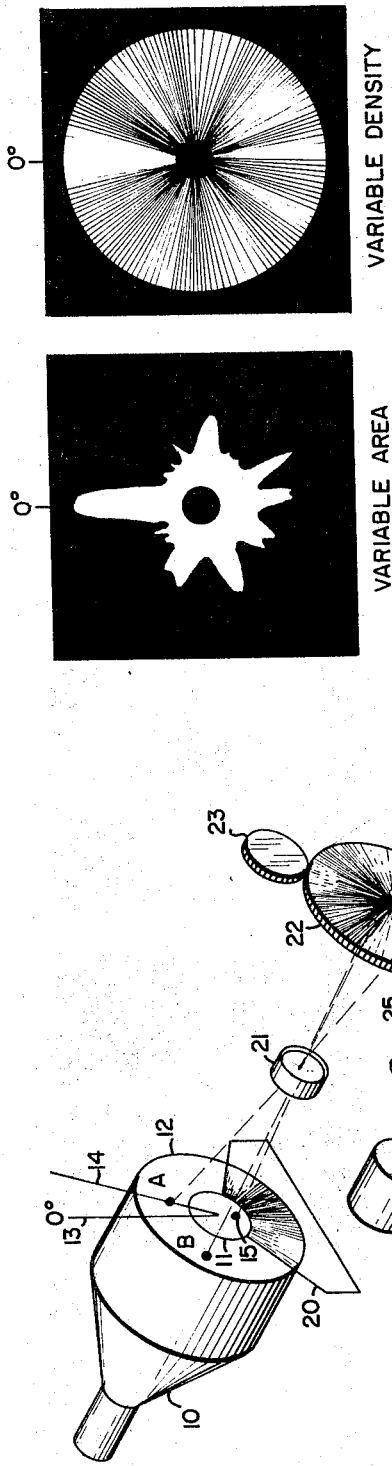
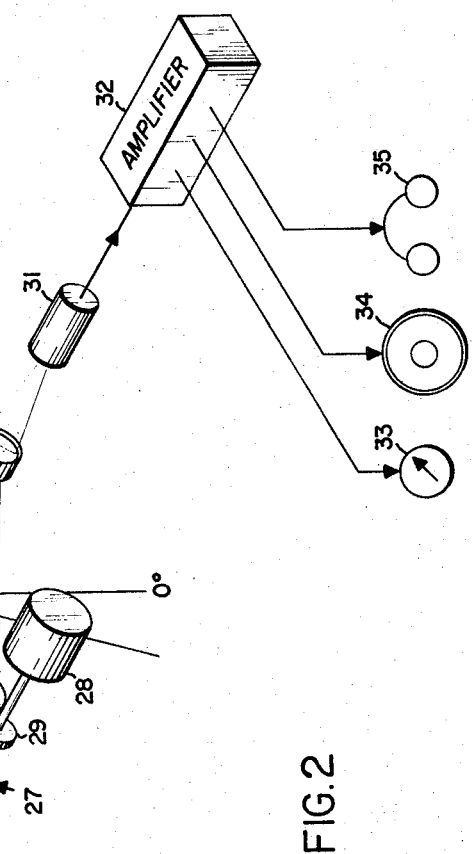
INVENTOR.
ARTHUR W. SEAR
BY Paul A. Welter
ATTORNEY

United States Patent Office 3,300,568
Patented Jan. 24, 1967

3,300,568
SONAR SIMULATION APPARATUS
Arthur W. Sear, Arcadia, Calif., assignor to Honeywell Inc., Minneapolis, Minn., a corporation of Delaware
Filed Sept. 9, 1965, Ser. No. 486,039
12 Claims. (Cl. 35—10.4)

This invention relates generally to simulator apparatus and more particularly relates to the design of a system for simulating passive sonar systems such as those found on surface ships or submarines.

Most war ships and submarines are equipped with passive sonar apparatus that is used to detect other ships or targets at sea. The hydrophones of a passive sonar system are basically noise detectors that are capable of detecting various sound waves that are transmitted through the water from a target or targets. The sounds that are picked up by the hydrophones may include target generated noise and pinging, ping echos, and noise emanating from marine life, sea state and own ship. The hydrophones have directional characteristics that enable the operator to determine target bearing, but the sounds that are picked up by the hydrophones must be judged subjectively by the operator. The masking effects of own ship noise, marine life, and sea state make it difficult for an operator to discriminate between actual target noise and background noise and to form a judgment on what he actually hears. If properly interpreted, however, these sounds can give information as to the type of target, its course and speed, and its range. At the persent time, the best means of detection and classification of a target are the ears of a good sonarsman.

Because of the importance of the operator to proper target detection and classification, it is necessary that the operator be thoroughly trained. It is almost impossible to train an operator without providing some training on an actual sonar system. Nevertheless, it is extremely expensive and impractical to use actual ships and submarines for training purposes. It is thus a practical necessity to employ a simulator that will generate in a realistic manner the information needed to thoroughly train the operator. The simulator should be as accurate and realistic in representing the real life situation as possible and yet be as inexpensive and easy to program as possible.

To provide effective operator training in detection, evasion, and tracking, sonar data must be presented with the same signal to noise ratios and spectral shapes that occur under the same conditions at sea. Those effects which do occur at sea but which have little effect upon the judgment of the operator should be simplified or omitted in order to reduce equipment complexity. The target noise must be presented as well as the masking effects of own ship noise, marine life, and sea state. The directional effects of the hydrophone or scanning switch must also be simulated since the effects of side lobes or other erratic parts of the receiving pattern may produce a very difficult discrimination problem for the operator. The present invention provides the operator with a system that simulates all of the important external and internal effects found in an actual system.

The basic philosophy of the simulation technique according to the present invention is as follows: A spot of light is displayed on a cathode ray tube (CRT) having a polar display. Own ship is assumed to be at the center of the display and the spot is positioned on the CRT to simulate target bearing. The spot is modulated in intensity by target radiated noise. A lens is used to form an image of the CRT face on an optical filter that has a variable density representing the directional pattern of own ship's transducer array. This filter is rotated to simulate turning of the ships scanning switch. The light passing through the optical filter is intercepted by a photo tube that acts as a detector to recover the various noise signals that correspond to target sounds as displayed on the CRT and as attenuated by the transducer directional pattern.

It is therefore a primary object of the present invention to provide a simulator system in which: target bearing and noise characteristics are presented as intensity modulated spots of light on a polar display device; the spots are projected on a filter that simulates the receiving beam pattern of own ship; and are then projected on a photo tube that converts the light signal to an electrical signal corresponding to target noise as attenuated by the receiving beam pattern.

Other objects of the invention will be apparent from the following specification and claims when considered in conjunction with the accompanying drawings, in which:

FIGURE 2 is a schematic diagram of the polar display device, beam forming system, and output indicators; and FIGURE 3 discloses for comparison a variable area filter and a variable density filter.

Figure 1:
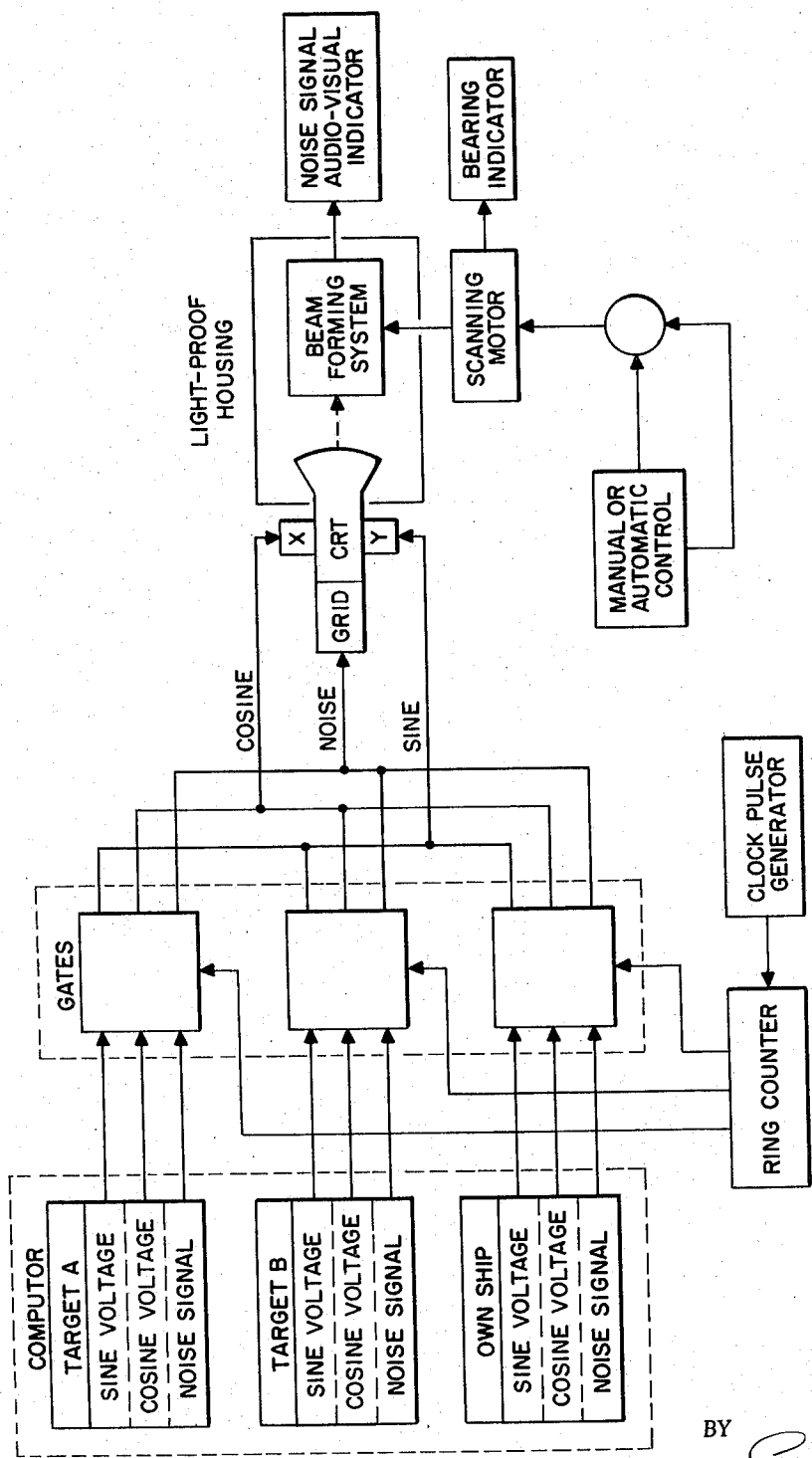
FIGURE 1 is a block diagram illustrating the arrangement of the entire simulator system.

Refer now to FIGURE 1. All of the information that is to be transferred to the operator is stored or programmed in a computer. The computer carries position information for each target as well as noise signals corresponding to the target. Target A could thus be a merchant ship, located at a certain bearing with respect to own ship, having certain noise characteristics. Target B could be a second ship or could be a school of fish having other distinct noise characteristics. In addition, the computer stores information relating to own ship, the purpose for which will be discussed later.

Information is stored in the computer in digital form and is converted to analog form before being sent to the simulator. Target bearing information is generated in the computer from the program and is back-dated by the length of time it takes for sound to travel through the media from the target to own ship. Numbers that equal the sine and cosine of each target bearing angle are stored in registers and are updated each second. An analog voltage signal is also provided by each of the target and own ship noise generators. These noise signals are programmed so that they will be properly attenuated and filtered to be equivalent to signals that would be picked up by the ship's hydrophones under the assumed problem conditions.

In the system described in FIGURE 1, the computer has been programmed with information relating to two targets and to own ship. If necessary for the particular problem, the number of targets could be increased or decreased.

A gate for each target and for own ship is also provided. The gates are driven in sequence by a three-position ring counter that is in turn switched by pulses from a 300 kc. clock pulse generator. As each gate is opened by the counter, the noise signal and the bearing sine and cosine voltages are applied to the cathode ray tube. Since the gates are operated in sequence, only one group of target information is applied to the CRT at any given instant. If necessary, summing networks and amplifiers may be added between the gates and the CRT.

The cosine and sine voltages defining the target bearing are applied to the X and Y deflection plates, respectively, of the CRT. The audio noise signal goes to the grid or brightness control element of the tube. Therefore, as the ring counter successively gates on target information signals, three spots of light appear on the tube face displaced from the center in a direction that represents the relative bearing of each target. Target A and target B will move around the tube face to simulate relative target bearing as programmed by the computer. The own ship signal will remain fixed at 180° relative to simulate own ship stern noise.

The instantaneous brightness of each spot is proportional to the magnitude of the target noise voltage at own ship's position for each target at that instant. At a clock pulse rate of 300 kc. per second, each spot of light will be stimulated at a rate of approximately 100 kc. per second. In effect, each spot of light becomes a 100 kc. light carrier that is amplitude modulated by target noise. This carrier frequency is more than adequate for transmission of the noise frequencies. The phosphor of the CRT should have a short persistence so that this will not limit frequency response but will add a small amount of smoothing to the light signal.

It is noted at this point that the noise signal from any individual target may contain a combination of frequencies representing not only the noise from the target itself, but the noise received in that direction from marine life and sea state.

Still with reference to FIGURE 1, the image produced on the CRT face is projected through a beam forming system enclosed in a light-proof housing. The beam forming system includes an optical filter that is characterized to represent the receiving beam characteristics of the ship's hydrophones. A scanning motor is provided to rotate the optical filter in response to either manual or automatic signals to represent the scanning of the ship's hydrophones. A bearing indicator is driven by the scanning motor to indicate the position of the optical filter. The image from the beam forming system is converted into an electrical signal that corresponds to the noise characteristics of the targets as attenuated by the optical filter. The electrical signal can be converted into either visual or aural signals suitable for monitoring by the operator.

Referring now to FIGURE 2, there is disclosed a schematic of the invention including a cathode ray tube 10, the beam forming system, and the output apparatus. CRT 10 corresponds to the CRT shown in FIGURE 1. The face of tube 10 is a polar display in which the operator or own ship is considered to be at the center. The face of tube 10 is divided into two zones, an inner circular zone 11 that is concentric with the center of the polar display, and an outer annular zone 12 that surrounds inner zone 11. Own ship information is presented within inner zone 11 while target information is presented in outer zone 12.

A line 13 extending from the center of zone 11 represents the bow of own ship or zero degrees relative. Formed on the face of tube 10 in zone 12 are two spots of light A and B, representing the relative bearings of targets A and B respectively. A line 14 passing through target A from the center of zone 11 indicates that target A has a relative bearing of approximately 30° with respect to own ship. It is noted that lines 13 and 14 do not actually appear on the tube face, but are included in the schematic for illustration purposes. Although the position of each spot of light represents the target bearing, the distance of the spot of light from the center of the tube face does not indicate target range. The presentation should therefore not be confused with a standard plan position indicator (PPI) in which a spot of light indicates both range and bearing.

A spot of light 15 is formed in zone 11. Spot 15 is located at a relative bearing of 180° and thus represents the stern of own ship. Spot 15 is modulated by a noise signal that represents the stern noise effects of own ship.

Mounted permanently in front of a portion of zone 12 is a stern gate filter 20. Filter 20 is an arcuate optical filter that simulates the effect of own ship's stern noise on the target signal. Filter 20 covers that portion of zone 12 corresponding to the stern of own ship. Filter 20 covers a rather wide area of the stern to correspond with the wide area of turbulence caused by the wake of own ship as it passes through the water. As the drawing indicates, filter 20 is darker at the position corresponding to the exact stern of own ship than it is in the area extending toward the beam of own ship.

As target A or B moves into the area covered by filter 20, the spot of light representing the target is attenuated by filter 20 in a manner similar to the attenuation of target signals caused by the turbulence in the water in the wake of own ship. The computer thus provides a noise signal that modulates spots A and B in accordance with target characteristics and other external attenuation factors. In addition, filter 20 adds an attenuation factor caused by the wake of own ship.

Mounted in front of the face of tube 10 is a first projection lens 21 that projects an image of the tube face on a variable density optical filter 22. Filter 22 is a circular variable density optical mask that is characterized to simulate the receiving beam pattern of own ship's sonar.

The receiving beam pattern of a ship's sonar, although designed to be somewhat directional, does not completely filter out sounds that are received from directions other than that in which the scanner is pointing. The receiving beam pattern of an actual sonar can be rotated either automatically or manually to scan the surrounding area. The direction of greatest sensitivity of the beam pattern is known to the operator so that he can determine the bearing of the target. At the same time, however, some return from all targets in the area will be received, depending upon the sensitivity of the beam pattern in that direction. Referring for a moment to FIGURE 3, there is disclosed a pair of corresponding beam patterns. The variable area mask is constructed by drawing a polar plot of the actual beam pattern of a sonar system on a translucent screen and then blacking out the area outside the pattern. The light area of the variable area mask shown in FIGURE 3 is thus a picture of an actual receiving beam pattern. The line marked 0 degrees corresponds to the direction of greatest sensitivity of the receiving beam pattern. Let us assume that a single target lies in the scan area at the direction marked 0 degrees. As the variable area mask is rotated, a continuous signal from the target will be received since the receiving beam pattern has a certain amount of sensitivity in all directions. The greatest signal, however, will be received when the pattern is directed as shown in FIGURE 3.

A variable area filter is not compatible with the present invention since spots of light are being used to represent targets. The variable area mask would be compatible with targets represented by a radial line on the CRT. If a variable area mask were used with the spots of light, however, the spot of light would either shine through completely or would be completely obscured. To make the optical filter compatible with the use of spots of light on the CRT, it was necessary to convert the variable area mask to a variable density mask. It can be seen from FIGURE 3 that the variable density mask is almost completely transparent in the direction marked 0 degrees. This transparent section corresponds to the area of greatest sensitivity on the variable area mask. The remainder of the variable density mask has been darkened to some extent to correspond with the sensitivity of the variable area mask. Thus, as the variable density mask is rotated in FIGURE 2, the spot of light representing a target will be attenuated to some degree as it passes through the mask. When the spot of light passes through the area marked 0 degrees, the least amount of attenuation will occur, corresponding to the area of greatest sensitivity of the actual receiving equipment. As the filter is rotated, the spot of light will be attenuated to some extent, again corresponding to the actual receiving equipment. It is noted that at least part of the light from each target will pass through the filter at all times. This again corresponds to an actual sonar system in which signals from all targets are constantly being picked up by the system.

Although it is not part of the invention claimed, the method of preparing the variable density filter might illustrate more clearly its function. One method of preparing the variable density filter is by a photographic technique. The variable area mask is placed in a frame and is revolved in front of a thin line light source. The light source would consist of a cathode ray tube of the flying spot scanner type that is driven along the Y axis from a high frequency triangular voltage wave. This CRT trace is projected onto the variable area beam pattern mask with a lens. One end of the projected CRT trace lies at the opaque center of the mask and the trace would extend beyond the mask area. The light from the trace passing through the variable area mask is collected at a photocell which will therefore have an output current proportional to the radius vector of the transparent beam pattern. A second cathode ray tube is provided having a similar trace on its face, the brightness of which is controlled by the current from the above photocell. This variable brightness trace from the second cathode ray tube is focused by a camera lens onto a film negative that is held in a film holder. The negative is revolved in unison with the variable area pattern mask. The film negative is thus exposed to the variable intensity trace on the second CRT to create the variable density pattern shown in FIGURE 3. If the variable area beam pattern mask is scaled to represent directional gain in db, then by proper control of light, the variable density pattern will also represent the beam gain in db. If complete accuracy is desired, a correction should be added to the output from the photocell since the light from the second CRT must expose a greater area of film as the radius of the variable density mask increases. Positive reproductions are made from the negative for the variable density masks used in the simulator equipment described herein.

Referring again to FIGURE 2, it can be seen that the circular variable density filter 22 is mounted for rotation in a pair of sprocket gears 23 and 24 and a drive gear 25. A scanning motor 26 operates drive gear 25 through a gear train 27. As shown schematically in FIGURE 1, means would be provided to either manually or automatically control the operation of scanning motor 26. Drive gear 25 also operates a servomotor 28 by means of a drive gear and shaft 29. The rotation of filter 22 would thus be accurately followed by the rotation of servomotor 28. A bearing indicator is connected to servomotor 28 as shown in FIGURE 1 to provide a visual indication of the position of the receiving beam pattern as represented by filter 22.

The image of the face of tube 10 passing through filter 22 is picked up by a second projector lens 30 and focused on a multiplier phototube 31. Phototube 31 converts the light image into an electrical signal. Phototube 31 can be any type of photoelectric cell that will provide this conversion from a light signal to an electrical signal. If a condensing lens 30 such as that shown in FIGURE 2 is used, it is necessary to mount a diffusing screen on the rear surface of filter 22 so that the filter acts as a source of light for lens 30. The size of lens 30 can also be selected to pick up the light passing through filter 22 and focus the image on the phototube according to well-known optical principles. The signal from tube 31 is sent to an amplifier 32. The amplified output signal could be presented on a visual indicator 33. The output signal could also be placed on a loud speaker 34 and a set of head phones 35.

The output signal from tube 31 is thus an electrical signal corresponding to the noise characteristics of the targets on the face of tube 10 as attenuated by the rotatable variable density optical filter 22.

*Operational summary*

The basic simulation method is shown in FIGURE 2. The targets are displayed as small spot sources of light in zone 12 on the face of CRT 10. The target spots move around the CRT to represent relative bearing with respect to own ship which is assumed to be at the center of the tube face. This presentation is similar to a PPI presentation except that range is simulated by the percent modulation of spot brightness rather than by radial distance. This comes about naturally because the light intensity is modulated by the target noise signal which has been attenuated proportional to the transmission loss through the media from the target to own ship. If contact with the target is lost, the light modulation would drop to zero, at which point the spot would have a steady brightness. The gain of the output amplifier should be adjusted so that 100% modulation would represent the maximum signal that would be picked up by the hydrophones of the actual equipment.

If necessary, the spot deflection system can be designed to have the sine and cosine voltages vary slowly over a limited range in order to spread the light over a zone on the CRT rather than allowing the spot to remain at one place for long periods of time.

Since the targets will be displayed on the CRT with their angular position shown in relative bearing, 180° will always be at the same position. This permits the stern gate, or hull baffling, to be effectively simulated by permanently mounting a variable density filter 20 in front of the CRT face. This filter is characterized to simulate attenuation of signals from targets in the vicinity of the stern of the ship. Stern gate filter 20 need only cover annular zone 12 where targets are displayed.

Own ship stern noise is displayed by a modulated light spot 15 lying along a radial line corresponding to 180° relative in zone 11. Spot 15 lies inside stern gate filter 20 so that the constant attenuation of filter 20 does not have to be compensated.

To simulate the scanning switch of the actual sonar equipment, an image of the CRT face is projected onto a circular filter or mask 22 by a projection lens 21. Circular mask 22 is essentially a variable density optical filter that is characterized to simulate the beam forming capability of the actual sonar system. Mask or filter 22 is turned by controls that are similar to those found on the actual sonar system. The targets are continuously displayed on the CRT just as sound waves are continuously passing through the transducer array from all targets in the area. When filter 22 is turned to permit light from a target to pass through the clear sector of the filter, the effect is the same as if the receiving beam of the sonar transducer array were directed toward the target. The other targets are discriminated against by the directional effect of the receiving beam pattern.

Light passing through filter 22 is concentrated by a lens 30 upon phototube 31. The phototube detects all the target signals proportional to the target sound level at own ship position and proportional to the discrimination of the receiving beam pattern. The operator thus hears a signal on speaker 34 or head phones 35 that is similar to the actual signal heard in a sonar system. The operator can rotate filter 22 to obtain a maximum signal from any given target, just as he would train the receiving beam of an actual sonar system. When the signal of greatest intensity is heard, the bearing indicator shown in FIGURE 1 will show the relative bearing of the target. The operator is thus provided with all controls and with all information normally provided with an actual passive sonar system. The complexity of the problem can be gradually increased by reprogramming the computer to meet the needs of the trainee.

From the above description it will be apparent that I have invented a training system having new and effective means for simulating a passive sonar system. Although the form of the invention described herein constitutes a preferred embodiment, it will be understood that changes may be made within the spirit of the invention limited only by the scope of the appended claims.

What I claim is:

1. A simulator for passive sonar apparatus, comprising:
   (a) a cathode ray tube having a polar display and including means for producing a spot of light;
   (b) means for moving the spot of light on the face of said tube to simulate a target, said spot being moved to simulate the relative bearing of the target with respect to own ship located at the center of said tube face;
   (c) means for modulating the intensity of said spot of light through a predetermined range to simulate the noise characteristics of the target;
   (d) a rotatable variable density optical filter characterized to simulate the receiving beam pattern of own ship's sonar mounted in front of said tube;
   (e) a first projection lens mounted between said tube and said filter to project an image of said tube face on said filter;
   (f) a phototube mounted opposite said filter from said first lens; and
   (g) a second projection lens mounted between said filter and said phototube to project said filtered image on said phototube, said phototube providing an output signal corresponding to the noise characteristics of said target as attenuated by said filter.

2. A simulator for passive sonar apparatus, comprising:
   (a) a cathode ray tube having a polar display and including means for producing a spot of light;
   (b) means for repositioning the spot of light to effectively produce a plurality of movable spots of light on the face of said tube to simulate a plurality of targets, said spots being movable to simulate the relative bearing of the targets with respect to own ship located at the center of said tube face;
   (c) means for modulating the intensity of said spots of light to simulate the individual noise characteristics of each of the targets;
   (d) a rotatable variable density optical filter characterized to simulate the receiving beam pattern of own ship's sonar mounted in front of said tube;
   (e) a first projection lens mounted between said tube and said filter to project an image of said tube face on said filter;
   (f) a phototube mounted opposite said filter from said first lens; and
   (g) a second projection lens mounted between said filter and said phototube to project said filtered image on said phototube, said phototube providing an output signal corresponding to the noise characteristics of said targets attenuated by said filter.

3. A simulator for passive sonar apparatus, comprising:
   (a) a cathode ray tube having a polar display and including means for producing a spot of light on said display;
   (b) means for moving the spot of light on the face of said tube to simulate a target, said spot being moved to simulate the relative bearing of the target with respect to own ship at the center of said tube face;
   (c) means for modulating the intensity of said spot of light to simulate the noise characteristics of the target;
   (d) a rotatable variable density optical filter characterized to simulate the receiving beam pattern of own ship's sonar mounted in front of said tube;
   (e) a first projection lens mounted between said tube and said filter to project an image of said tube face on said filter;
   (f) a phototube mounted opposite said filter from said first lens;
   (g) a second projection lens mounted between said filter and said phototube to project said filtered image on said phototube, said phototube providing an output signal corresponding to the noise characteristics of said target as attenuated by said filter;
   (h) output means including amplifier means connected to said phototube to provide an indication of said output signal; and
   (i) bearing indication means connected to said rotatable filter to indicate the position of said filter.

4. A simulator for passive sonar apparatus, comprising:
   (a) a cathode ray tube having a polar display and including means for producing a spot of light on said display, said polar display including a first circular display zone concentric with the center of said tube face and a second annular display zone surrounding said first zone;
   (b) means for positioning the spot of light in said first zone during a first time period at a fixed bearing corresponding to the stern of said own ship;
   (c) means for repositioning the spot of light in said second zone during time periods alternating with the first time to simulate a target, said spot being movable to simulate the relative bearing of the target with respect to own ship located at the center of said tube face;
   (d) means for modulating the intensity of said second spot of light to simulate the noise characteristics of the target, and for modulating the intensity of said first spot of light to simulate the stern noise characteristics of own ship;
   (e) a rotatable variable density optical filter characterized to simulate the receiving beam pattern of own ship's sonar mounted in front of said tube;
   (f) a first projection lens mounted between said tube and said filter to project an image of said tube face on said filter;
   (g) a phototube mounted opposite said filter from said first lens; and
   (h) a second projection lens mounted between said filter and said phototube to project said filtered image on said phototube, said phototube providing an output signal corresponding to the noise characteristics of said target, and of said own ship's stern, as attenuated by said filter.

5. A simulator for passive sonar apparatus, comprising:
   (a) a cathode ray tube having a polar display and including means for producing a spot of light;
   (b) means for moving the spot of light on the face of said tube to simulate a target, said spot being moved to simulate the relative bearing of the target with respect to own ship's position at the center of said tube face;
   (c) means for modulating the intensity of said spot of light to simulate the noise characteristics of the target;
   (d) a rotatable variable density optical filter characterized to simulate the receiving beam pattern of own ship's sonar;
   (e) means for projecting an image of said tube face on said filter;
   (f) photoelectric means for converting light images to electrical signals; and
   (g) means for projecting said filtered image on said photoelectric means, said photoelectric means providing an output signal corresponding to the noise characteristics of said target as attenuated by said filter.

6. Simulated target detection training apparatus, comprising:
   (a) a cathode ray tube having a polar display and including means for producing a spot of light on the display;
   (b) means for quickly repositioning the spot of light to produce a plurality of movable spots of light on the face of said tube to simulate a plurality of targets, said spots being movable to simulate the bearing of the targets with respect to an operator located at the center of said tube face;
(c) means for modulating the intensity of said spots of light to simulate the individual noise characteristics of each of the targets;
(d) a variable density optical filter characterized to simulate the receiving beam pattern of the operator's detection equipment;
(e) means for projecting an image of said tube face on said filter; and
(f) means for converting said filtered image to an output signal corresponding to the noise characteristics of said targets as attenuated by said filter.

7. A simulator for passive sonar apparatus, comprising:
(a) a cathode ray tube having a polar display and including means for producing a plurality of spots of light on said display, said polar display including a first circular display zone concentric with the center of said tube face and a second annular display zone surrounding said first zone;
(b) means operating in conjunction with said cathode ray tube for producing a first spot of light in said first zone at a fixed bearing corresponding to the stern of said own ship;
(c) means operating in conjunction with said cathode ray tube for producing a second movable spot of light in said second zone to simulate a target, said spot being movable to simulate the relative bearing of the target with respect to own ship located at the center of said tube face;
(d) means for modulating the intensity of said second spot of light to simulate the noise characteristics of the target and for modulating the intensity of said first spot of light to simulate the stern noise characteristics of own ship;
(e) a rotatable variable density optical filter characterized to simulate the receiving beam pattern of own ship's sonar mounted in front of said tube;
(f) means for projecting an image of said tube face on said filter;
(g) photoelectric means for converting light images to electrical signals; and
(h) means for projecting said filtered image on said photoelectric means, said photoelectric means providing an output signal corresponding to the noise characteristics of said target, and of said own ship's stern, as attenuated by said filter.

8. A simulator as defined in claim 7 wherein there is further provided an arcuate variable density optical filter mounted over a portion of said second zone at a fixed location corresponding to the stern of said own ship to simulate the attenuation of actual target signals caused by turbulence in the wake of said own ship.

9. A simulator as defined in claim 7 wherein there are further provided means for rotating said filter and means for indicating the position of said filter as an aid in determining target bearing.

10. Simulator apparatus, comprising:
(a) a polar display device including means for displaying a spot of light on said display device;
(b) means for moving said spot of light to simulate movement of a target with respect to an operator assumed located at the center of said display device;
(c) means for changing the intensity of said spot of light to simulate preselected target characteristics other than bearing;
(d) a movable variable density filter characterized to simulate the receiving pattern of the operator's normal target detection device;
(e) means for projecting an image of said polar display device on said filter; and
(f) means for detecting said filtered image and for converting said filtered image to an output signal having characteristics corresponding to said preselected target characteristics as attenuated by said filter.

11. Simulator apparatus as defined in claim 10 wherein there are further provided means for rotating said variable density filter to simulate rotation of said normal target detection device, and means for indicating the position of said filter as an aid in determining target bearing.

12. Simulator apparatus as defined in claim 10 wherein there is further provided means for converting said output signal to give an aural indication of said preselected target characteristics as attenuated by said filter.

No references cited.

CHESTER L. JUSTUS, *Primary Examiner.*

T. H. TUBBESING, *Assistant Examiner.*